US012552371B2

(12) United States Patent
Yata et al.

(10) Patent No.: US 12,552,371 B2
(45) Date of Patent: Feb. 17, 2026

(54) COLLISION DAMAGE REDUCTION DEVICE AND COLLISION DAMAGE REDUCTION METHOD

(71) Applicant: Mitsubishi Electric Corporation, Tokyo (JP)

(72) Inventors: Masahiro Yata, Tokyo (JP); Kentaro Ishikawa, Tokyo (JP); Hiroki Fujiyoshi, Tokyo (JP); Nariaki Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 18/588,349

(22) Filed: Feb. 27, 2024

(65) Prior Publication Data

US 2024/0383471 A1  Nov. 21, 2024

(30) Foreign Application Priority Data

May 18, 2023  (JP) ................................ 2023-082019

(51) Int. Cl.
*B60W 30/09* (2012.01)
*B60R 19/48* (2006.01)

(52) U.S. Cl.
CPC ........... *B60W 30/09* (2013.01); *B60R 19/483* (2013.01); *B60W 2520/06* (2013.01);
(Continued)

(58) Field of Classification Search
CPC .. B60W 30/09; B60W 30/08; B60W 30/0956; B60W 30/06; B60W 2520/06;
(Continued)

(56) References Cited

U.S. PATENT DOCUMENTS

| 2017/0341642 A1* | 11/2017 | Suzuki | ..................... G07C 5/00 |
| 2019/0197322 A1* | 6/2019 | Suzuki | ..................... G06T 7/73 |
| 2023/0106562 A1* | 4/2023 | Bozich | ............... B60W 40/105 |
| | | | 340/425.5 |

FOREIGN PATENT DOCUMENTS

| JP | 6-36197 A | 2/1994 |
| JP | 2007-230319 A | 9/2007 |

(Continued)

OTHER PUBLICATIONS

Communication dated Sep. 30, 2025, issued in Japanese Application No. 2023-082019.

*Primary Examiner* — George C Jin
(74) *Attorney, Agent, or Firm* — Sughrue Mion, PLLC

(57) ABSTRACT

A collision damage reduction device of the present disclosure includes: a departure judgment unit which detects that a vehicle is in a departing state; a departing-state acceleration velocity determination unit which determines upper limits for an acceleration and a velocity of the vehicle, when the vehicle is in the departing state; and a control unit which controls the acceleration and the velocity of the vehicle on the basis of upper limits determined by the departing-state acceleration velocity determination unit. Even in a situation in which an obstacle is not detected, the departing-state acceleration velocity determination unit determines, as first upper limits, such upper limits for the acceleration and the velocity that do not cause serious damage even if the vehicle contacts with assumed said obstacle.

11 Claims, 7 Drawing Sheets

(52) U.S. Cl.
CPC ... *B60W 2554/802* (2020.02); *B60W 2720/10* (2013.01); *B60W 2720/106* (2013.01)

(58) Field of Classification Search
CPC ...... B60W 2554/802; B60W 2720/106; B60R 19/483
See application file for complete search history.

(56) References Cited

FOREIGN PATENT DOCUMENTS

| | | | |
|---|---|---|---|
| JP | 2014-091351 A | 5/2014 | |
| WO | WO-2024195372 A1 * | 9/2024 | ............. B60K 35/28 |

* cited by examiner

COLLISION DAMAGE REDUCTION DEVICE AND COLLISION DAMAGE REDUCTION METHOD

BACKGROUND

The present disclosure relates to a collision damage reduction device and a collision damage reduction method.

At the time of vehicle departure, a condition of obstacle detection or the environment is different from that in normal traveling, and therefore there is a high risk of colliding with an unexpected obstacle (e.g., a stone under the bottom, a wheel chock, or a safety cone left unremoved in front of a vehicle).

For example, a departure safety device described in Patent Document 1 has a sensor at the bottom of a vehicle and permits departure when it is confirmed that there is no person or animal under the bottom, thus preventing collision.

A driving assistance device described in Patent Document 2 performs departure of a vehicle with a smaller drive force than for the accelerator position when an obstacle is detected in the vehicle advancement direction, thus reducing collision damage.

Patent Document 1: Japanese Laid-Open Patent Publication No. 2007-230319

Patent Document 2: Japanese Laid-Open Patent Publication No. 2014-91351

However, in the departure safety device described in Patent Document 1, it is necessary to separately provide a dedicated sensor for sensing an area under the bottom of the vehicle only for the time of departure, thus having a problem that the system and the device are complicated and require high cost.

In the driving assistance device in Patent Document 2, first, it is necessary to detect an obstacle in the vehicle advancement direction. In particular, in a case where the vehicle is in a stopped state, e.g., before departure, an obstacle sensor operating under the assumption that the vehicle is moving is lowered in recognition accuracy, so that there is a possibility of failing to detect an obstacle.

Specific examples of such an "obstacle sensor that operates under the assumption that a vehicle is moving" are as follows.

(1) A millimeter-wave radar sensor mounted to a vehicle or installed in an infrastructure Object identification performance may be enhanced by detecting change in a relative distance or a Doppler velocity difference with respect to the own vehicle that is moving.

(2) A camera mounted to a vehicle or installed in an infrastructure

Object identification performance may be enhanced when a difference arises in change in a nearby object and a background while the own vehicle moves.

SUMMARY

The present disclosure has been made to solve the above problems, and an object of the present disclosure is to, at the time of departure, reduce collision damage with respect to an obstacle that has not been detected in a vehicle stopped state, by a collision damage reduction device and a collision damage reduction method which do not require an additional sensor and do not impair performance of existing obstacle sensors.

A collision damage reduction device according to the present disclosure includes: a departure judgment unit which detects that a vehicle is in a departing state; a departing-state acceleration velocity determination unit which determines upper limits for an acceleration and a velocity of the vehicle, when the vehicle is in the departing state; and a control unit which controls the acceleration and the velocity of the vehicle on the basis of the upper limits determined by the departing-state acceleration velocity determination unit. Even in a situation in which an obstacle is not detected, the departing-state acceleration velocity determination unit determines, as first upper limits, such upper limits for the acceleration and the velocity that do not cause serious damage even if the vehicle contacts with assumed said obstacle.

A collision damage reduction method according to the present disclosure includes: a departure judgment step of detecting that a vehicle is in a departing state; a departing-state acceleration velocity determination step of determining upper limits for an acceleration and a velocity of the vehicle, when the vehicle is in the departing state; and a control step of controlling the acceleration and the velocity of the vehicle on the basis of the upper limits determined in the departing-state acceleration velocity determination step. In the departing-state acceleration velocity determination step, even in a situation in which an obstacle is not detected, such upper limits for the acceleration and the velocity that do not cause serious damage even if the vehicle contacts with assumed said obstacle are determined as first upper limits.

The collision damage reduction device and the collision damage reduction method according to the present disclosure make it possible to, at the time of departure, reduce collision damage even if there is an obstacle that has not been detected in a vehicle stopped state, by a vehicle control method which does not require an additional sensor and does not impair performance of existing obstacle sensors.

DETAILED DESCRIPTION OF THE EMBODIMENTS

Hereinafter, the configuration and operation of a collision damage reduction device and a collision damage reduction method according to the present disclosure will be described in a preferred embodiment with reference to the drawings.

First Embodiment

<Configuration of Collision Damage Reduction Device>

Figure 1:
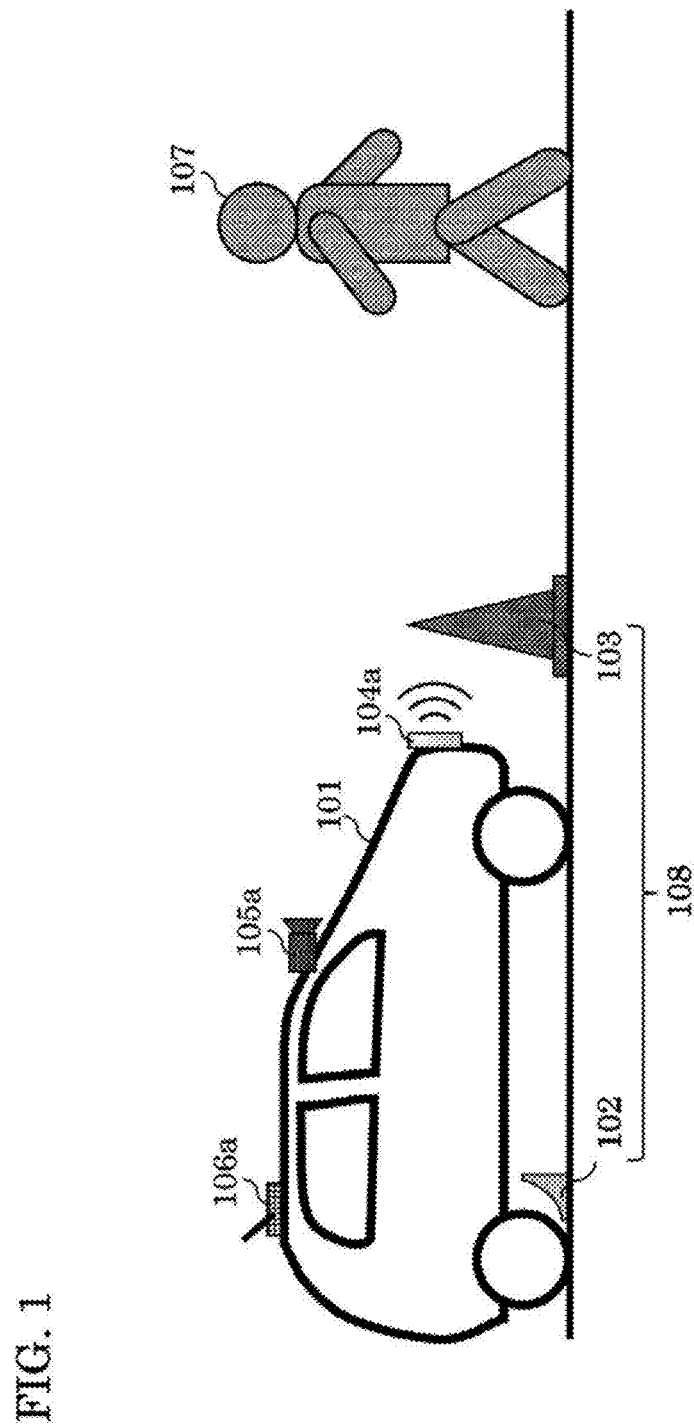
FIG. 1 schematically shows a vehicle to which a collision damage reduction device according to the first embodiment of the present disclosure is mounted, and a situation around the vehicle.

FIG. 1 schematically shows an own vehicle 101 to which a collision damage reduction device 500 according to the first embodiment of the present disclosure is mounted, and a situation around the own vehicle 101. In the first embodiment, the own vehicle 101 is an automated driving vehicle of level 4 (with no driver) monitored by a remote monitoring control center.

The own vehicle 101 is provided with a camera 105a (hereinafter, may be referred to as a front camera sensor) for detecting a stationary obstacle 108 or a moving object 107, e.g., a pedestrian, present in front of the own vehicle 101. The camera 105a takes an image of a road surface in an imaging range in front of the own vehicle 101. The camera 105a is a kind of imaging sensor, and serves to improve detection performance by a difference in change in the obstacle 108 and a background of the obstacle 108 or by change in optical characteristics for reflection or the like, during traveling of the own vehicle 101.

The own vehicle 101 is provided with a millimeter-wave radar sensor 104a for detecting the moving object 107 or the stationary obstacle 108 in front of the own vehicle 101 during normal traveling. The millimeter-wave radar sensor 104a is a kind of ranging sensor, and serves to improve detection performance by change in a distance or a relative velocity with respect to the obstacle 108 during traveling of the own vehicle 101.

The own vehicle 101 is provided with a notification unit 106a. The notification unit 106a notifies a remote monitoring control center (not shown) of information about the moving object 107 detected by the own vehicle 101, for example.

There is a possibility that various obstacles 108 are present and obstruct a departure operation of the own vehicle 101. Specific examples of various obstacles 108 include a wheel chock 102 left unremoved and a safety cone 103 left unremoved, as shown in FIG. 1.

Figure 2:
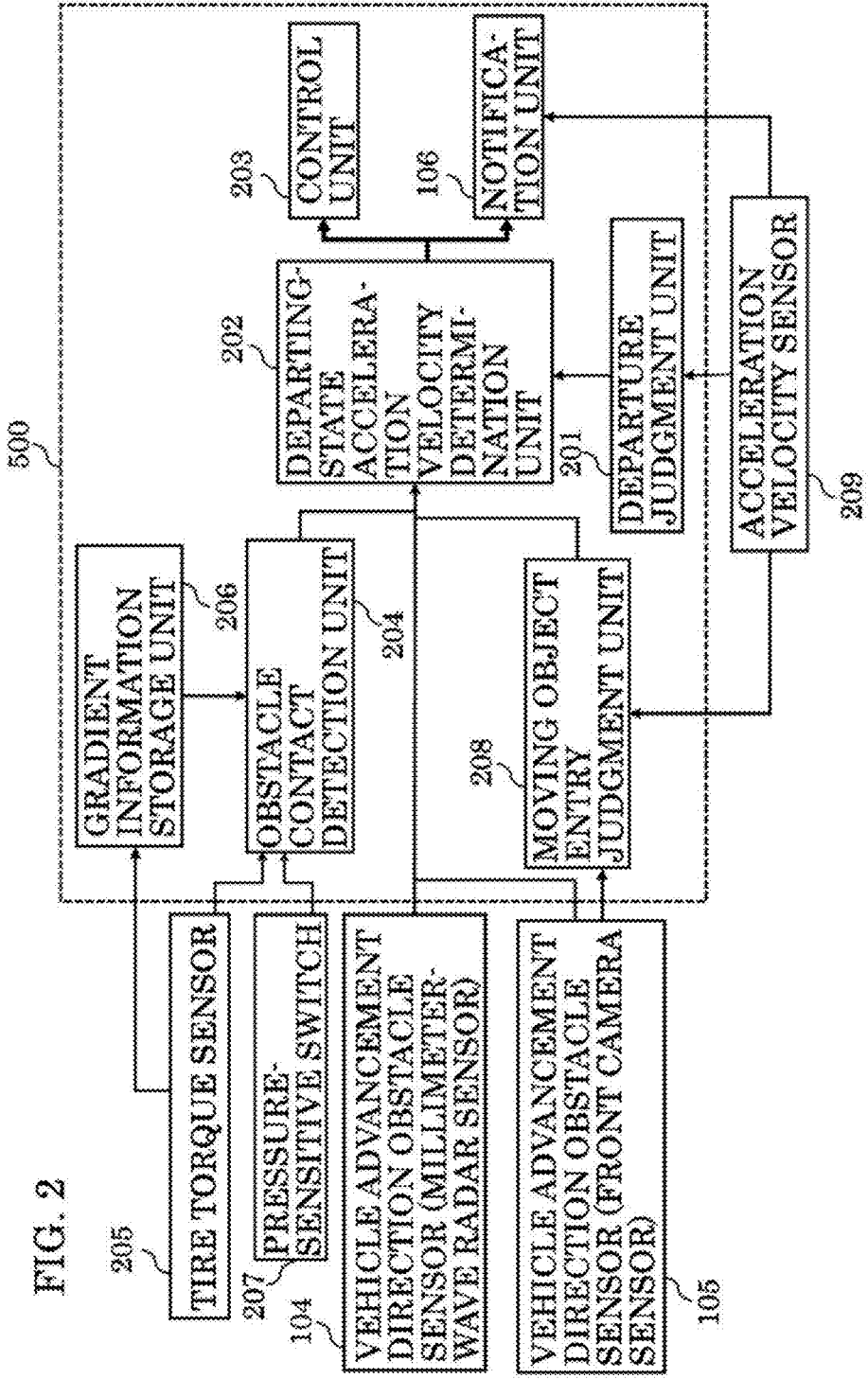
FIG. 2 is a function block diagram of the collision damage reduction device according to the first embodiment.
Figure 3:
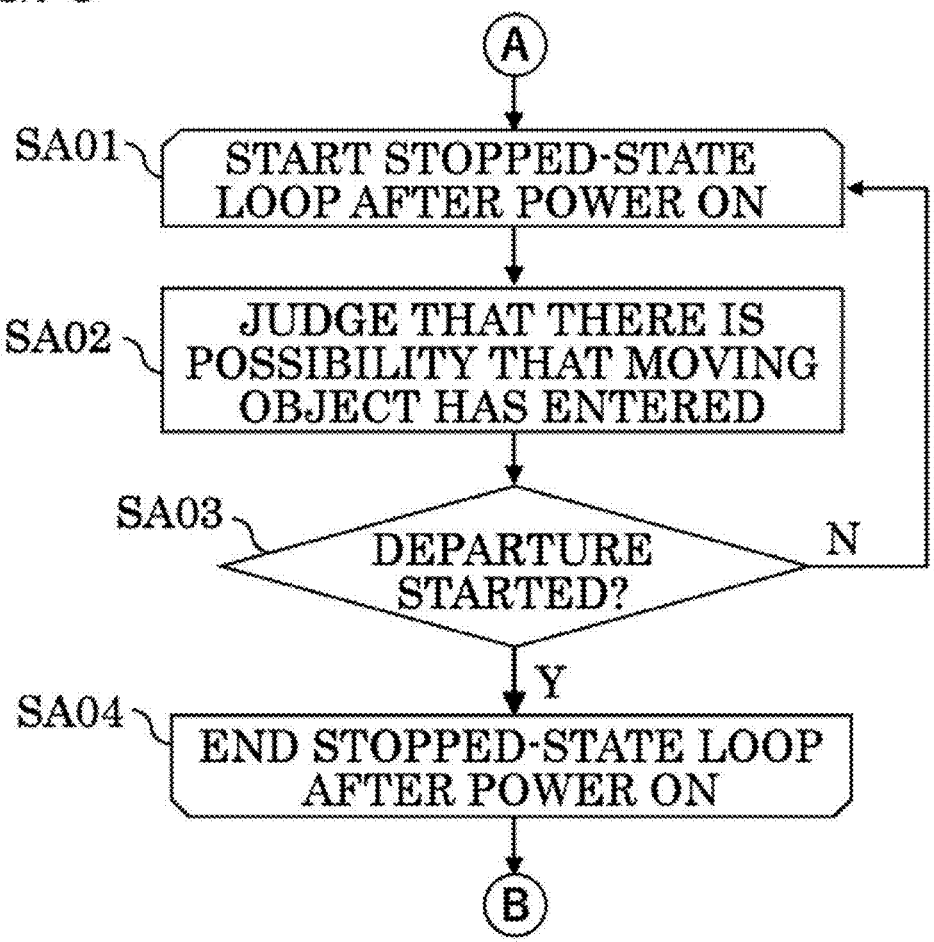
FIG. 3 is a flowchart showing a stopped-state loop after power on, in operation of the collision damage reduction device according to the first embodiment.

FIG. 2 is a block diagram showing the configuration of the collision damage reduction device 500 according to the first embodiment. The collision damage reduction device 500 includes a departure judgment unit 201, a departing-state acceleration velocity determination unit 202, a control unit 203, an obstacle contact detection unit 204, a gradient information storage unit 206, a moving object entry judgment unit 208, and a notification unit 106.

The departure judgment unit 201 judges whether or not the own vehicle 101 is in a departing state, i.e., in a state until reaching normal traveling from when the own vehicle 101 in a stopped state starts departure (in the present embodiment, until traveling 10 m from the start of departure). The departing-state acceleration velocity determination unit 202 determines upper limits for the acceleration and the velocity. The control unit 203 controls at least the acceleration and the velocity of the own vehicle 101.

The obstacle contact detection unit 204 detects contact with the obstacle 108. The gradient information storage unit 206 calculates a gradient at the present position in accordance with torques applied to tires and outputted from a tire torque sensor 205, and stores the gradient information for the last 10 m path through which the own vehicle 101 travels, in a nonvolatile memory.

During a stopped state of the own vehicle, the moving object entry judgment unit 208 analyzes video from the camera 105a and continues to count an object that has come into an area within 1 m around the vehicle and an object that goes out of the area. Then, just before the own vehicle 101 starts departure, if the count for objects that have come in is larger than the count for objects that have gone out, the moving object entry judgment unit 208 judges that the moving object 107 has entered the area around the vehicle.

The collision damage reduction device 500 acquires information around the own vehicle 101, using various sensors mounted to the own vehicle 101. The various sensors are, for example, the tire torque sensor 205 for detecting a torque applied to each of four tires, a pressure-sensitive switch 207 which is provided inside a vehicle front bumper and detects contact of an object when the object contacts with the bumper, an acceleration velocity sensor 209 for detecting the acceleration and the velocity of the own vehicle, a vehicle advancement direction obstacle sensor (millimeter-wave radar sensor) 104, a vehicle advancement direction obstacle sensor (front camera sensor) 105, and the like, as shown in FIG. 2. In the function block diagram in FIG. 2, the front camera sensor serves as both of the vehicle advancement direction obstacle sensor and an entry sensor for the moving object entry judgment unit 208, but sensors may be individually provided for them.

<Operation of Collision Damage Reduction Device>

Operation of the collision damage reduction device 500 according to the first embodiment is shown in flowcharts in FIG. 3 to FIG. 6. With reference to the flowcharts in FIG. 3 to FIG. 6, flow of operation of the collision damage reduction device 500 according to the first embodiment, i.e., the collision damage reduction method according to the first embodiment, will be described below.

<Operation of Stopped-State Loop After Power On>

First, it is assumed that the own vehicle 101 is in a stopped state just after the collision damage reduction device 500 is powered on. In this case, operation is started from step SA01 in FIG. 3. That is, a stopped-state loop just after power on is started from step SA01.

Next, in step SA02, the moving object entry judgment unit 208 judges that there is a possibility that a moving object has entered. This is because there is no means for judging whether any moving object 107 has entered or exited the area around the own vehicle, until power on, and therefore the possibility that the moving object 107 is present as an obstacle at a blind spot for the own vehicle 101 or the like needs to be taken into consideration.

In step SA03, whether or not the own vehicle 101 starts departure is judged. If the own vehicle 101 does not depart, the process returns to step SA01, and if the own vehicle 101 starts departure, the process proceeds to step SA04.

In step SA04, the stopped-state loop just after power on is ended, and the process proceeds to step SB01.

<Operation in Departing-State Loop>

Figure 4:
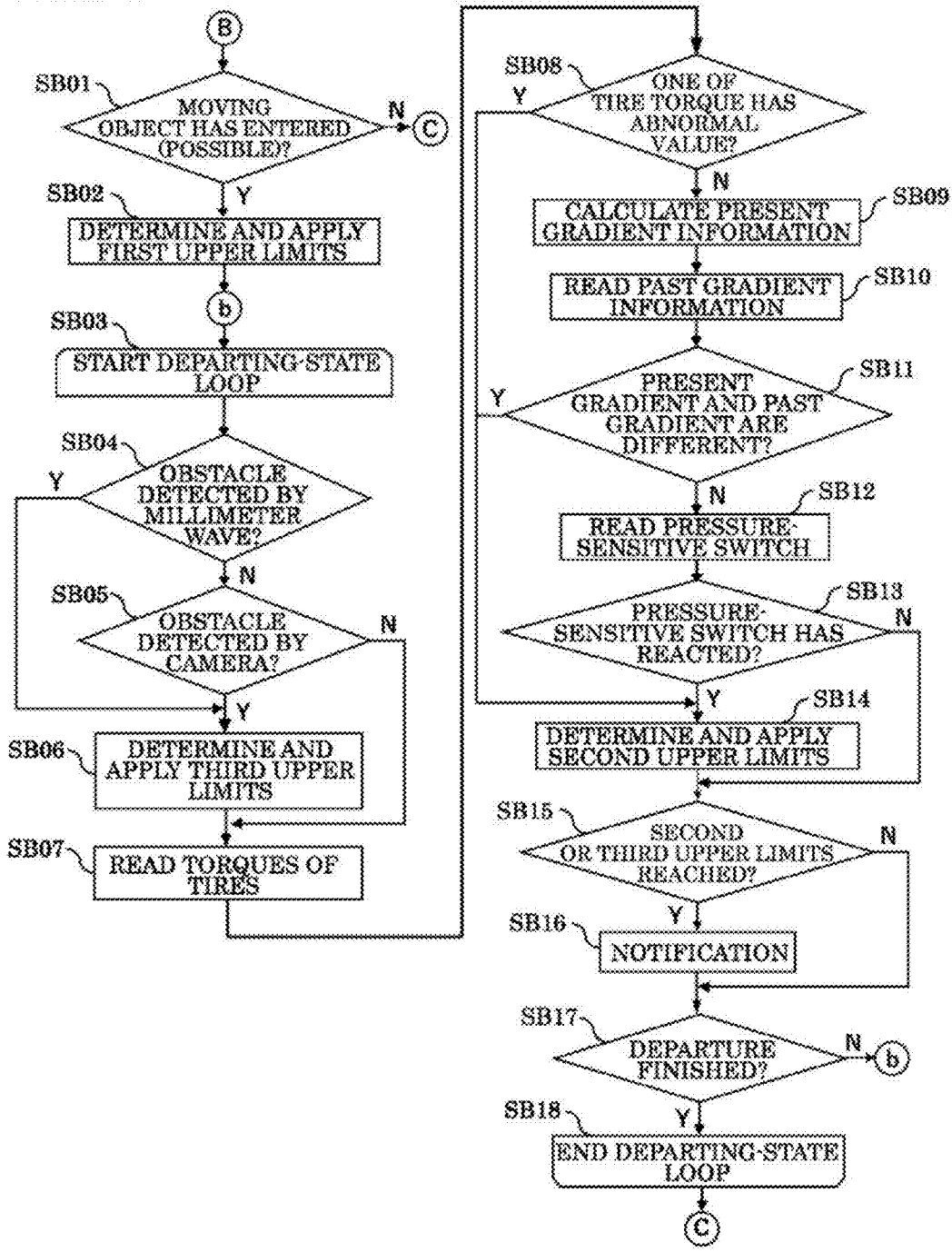
FIG. 4 is a flowchart showing a departing-state loop in operation of the collision damage reduction device according to the first embodiment.

Operation in a departing-state loop of the collision damage reduction device 500 shown in the flowchart in FIG. 4 will be described below.

In step SB01, the moving object entry judgment unit 208 judges whether or not any moving object 107 has entered. At this time, the case where "there is a possibility that a moving object has entered" as described above is also treated as a case where "a moving object has entered". If it can be judged that such a moving object 107 has not entered, the possibility of collision with the obstacle 108 is low and therefore the process proceeds to step SC01. Otherwise, the process proceeds to step SB02.

In step SB02, the departing-state acceleration velocity determination unit 202 determines first upper limits for the acceleration and the velocity (hereinafter, referred to as first upper limits), and applies the first upper limits to control.

The acceleration and the velocity at the first upper limits are set so that serious damage will not occur even if the own vehicle 101 contacts with an assumed obstacle 108. For example, in a case where the wheel chock 102 left unremoved is present as one of assumed obstacles 108, the acceleration at the first upper limit may be calculated from an upper limit of a force that does not cause the own vehicle 101 to run over the wheel chock 102, and the vehicle body weight of the own vehicle 101. Further, the velocity at the first upper limit may be calculated from an upper limit of kinetic energy that does not damage the wheel chock 102 and the own vehicle 101, and the vehicle body weight of the own vehicle 101. However, the setting method for the first upper limits is not limited to the above. The first upper limit may be calculated from an upper limit of an acceleration that does not make an occupant feel uncomfortable, or the first upper limit may be set for only one of the acceleration or the velocity.

From step SB03, the departing-state loop is started. In step SB04, whether or not any obstacle 108 is detected in the own-vehicle advancement direction is judged using millimeter-wave reflection. Even if no obstacle 108 is detected during the own-vehicle stopped state, at this time, the own vehicle 101 is traveling with the first upper limit set as the upper limit acceleration or the upper limit velocity, and obstacle detection accuracy by millimeter-wave reflection might be improved owing to traveling, as described above. If any obstacle 108 is detected, the process proceeds to step SB06, and if no obstacle 108 is detected, the process proceeds to step SB05.

Next, in step SB05, as in step SB04, whether or not any obstacle 108 is detected in the own-vehicle advancement direction by the front camera sensor 105*a* is judged. If any obstacle 108 is detected, the process proceeds to step SB06, and if no obstacle 108 is detected, the process proceeds to step SB07.

Next, in step SB06, since the obstacle 108 is detected in the own-vehicle advancement direction, the acceleration and the velocity at third upper limits not greater than the first upper limits are determined and applied to control. In the first embodiment, the acceleration and the velocity at the third upper limits are both 0. Thus, in a case where there is any obstacle 108 in the advancement direction, the own vehicle 101 is stopped and avoids contact.

Next, in step SB07, torques of the tires are read from the tire torque sensor 205. In step SB08, among the torques of the tires read in step SB07, whether or not only one tire torque has a prominently high or low abnormal value (abnormal torque), is judged. In a case where one tire torque has a prominently high abnormal value (abnormal torque), there is a possibility that the own vehicle 101 is treading the obstacle 108 such as the wheel chock 102 and the tire is running thereon. In a case where one tire torque has a prominently low abnormal value (abnormal torque), there is a possibility that the own vehicle 101 is treading the obstacle 108 such as clothing and the tire is spinning. Here, abnormal value judgment may be performed by a method other than the above ones. If there is an abnormal value (abnormal torque), the process proceeds to step SB14, and otherwise, the process proceeds to step SB09.

Next, in step SB09, the present gradient information is calculated from the tire torques.

Next, in step SB10, gradient information at the same location in the past is acquired.

Next, in step SB11, the present gradient in step SB09 is compared with the gradient at the same position in the past in step SB10. If a sufficient difference is recognized between the present gradient and the past gradient, there is a possibility of being in contact with the obstacle 108 such as a stone that has entered under the bottom of the own vehicle 101 during a stopped state. If there is a gradient difference, the process proceeds to step SB14, and otherwise, the process proceeds to step SB12.

Next, in step SB12, the pressure-sensitive switch 207 at the bumper is read.

Next, in step SB13, whether or not there is a reaction in the pressure-sensitive switch 207 at the bumper is judged. If there is a reaction in the pressure-sensitive switch 207 at the bumper, there is a possibility of being in contact with the obstacle 108 such as the safety cone 103 placed in the advancement direction of the own vehicle 101. If there is a reaction in the pressure-sensitive switch 207 at the bumper, the process proceeds to step SB14, and if there is no reaction, the process proceeds to step SB15.

Next, in step SB14, since it is detected that the own vehicle 101 contacts with the obstacle 108, the acceleration and the velocity at second upper limits not greater than the first upper limits are determined and applied to control. In the first embodiment, the acceleration and the velocity at the second upper limits are both 0. Thus, in a case where the own vehicle 101 contacts with the obstacle 108, the own vehicle 101 is stopped and avoids increase in damage.

Next, in step SB15, whether or not the velocity or the acceleration of the own vehicle 101 has reached the set second upper limit or the set third upper limit, is judged. That is, whether or not presence of the obstacle 108 is recognized and reflected in control is judged. If the second upper limit or the third upper limit has been reached, the process proceeds to step SB16, and otherwise, the process proceeds to step SB17.

Next, in step SB16, the remote monitoring control center that monitors the vehicle is notified that presence of the obstacle 108 is recognized and the presence of the obstacle 108 is reflected in control. In the first embodiment, since the acceleration and the velocity at the second upper limit and the third upper limit are both 0, the own vehicle 101 is in a stopped state. A notified control-center person can come to the site to remove the target obstacle 108. The notification destination is not limited to the remote monitoring control center and may be an occupant or the like.

Next, in step SB17, whether or not departure of the own vehicle 101 has finished is judged. In the first embodiment, a period until the own vehicle 101 travels by 10 m from the start of departure is defined as a departing state, and traveling thereafter is defined as normal traveling. In this case, the departure is considered to be finished at the time when the own vehicle 101 is switched to normal traveling. In addition, a case where the own vehicle 101 stops without reaching normal traveling during a departing state is also treated as finish of the departure. The traveling distance during a departing state can be calculated by time integration based on the velocity sensor. If the departure has not finished, the process returns to step SB03, and if the departure has finished, the process proceeds to step SB18.

In step SB18, the departing-state loop is ended and the process proceeds to step SC01.

<Operation in Normal Traveling Loop>

Figure 5:
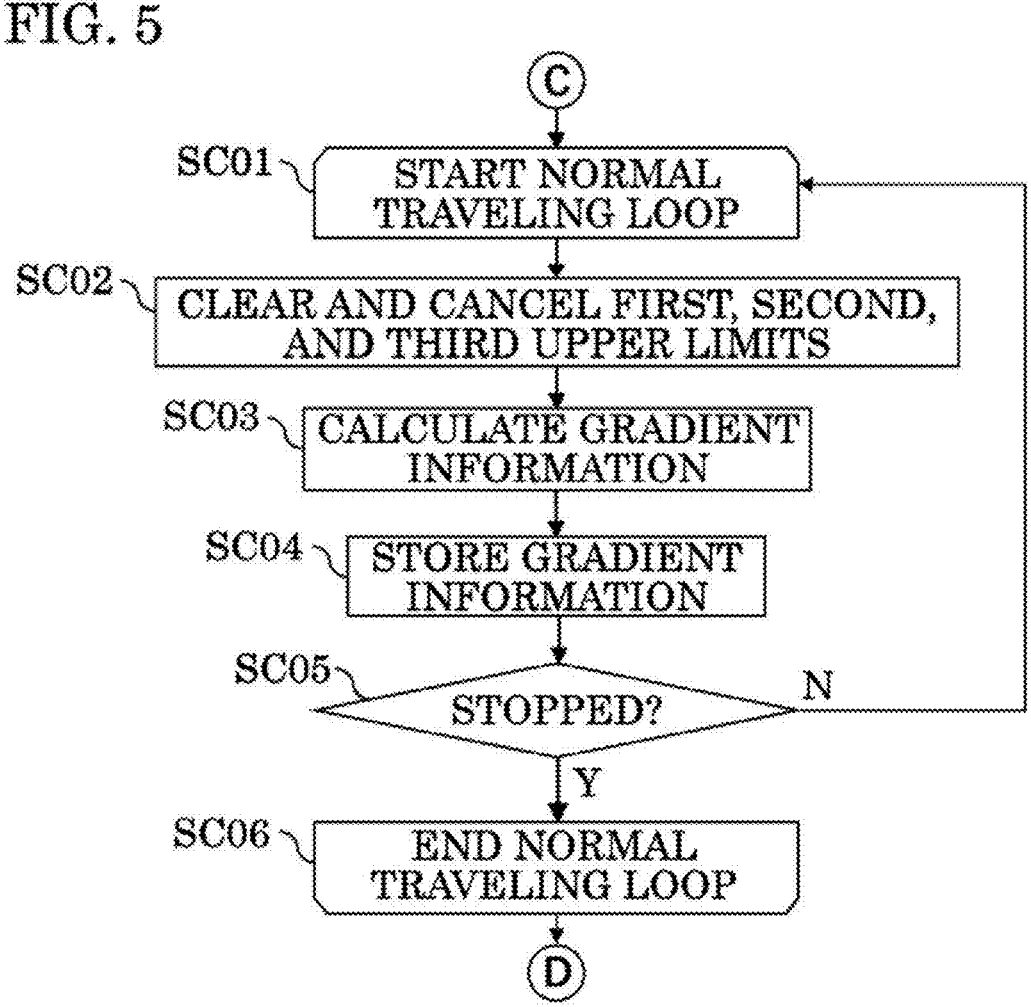
FIG. 5 is a flowchart showing a normal traveling loop in operation of the collision damage reduction device according to the first embodiment.

In step SC01 shown in the flowchart in FIG. 5, the normal traveling loop is started.

In step SC02, the first, second, and third upper limits determined and applied in the departing-state loop are cleared and thus are canceled in control.

Next, in step SC03, torques of the tires are acquired from the tire torque sensor 205 and gradient information is calculated.

Next, in step SC04, the gradient information at the present position calculated in step SC03 is stored in the gradient information storage unit 206. The information stored in the gradient information storage unit 206 is referred to in the next time and later in step SB10.

Next, in step SC05, whether or not the own vehicle 101 is stopped is judged. If the own vehicle 101 is not stopped, the process returns to step SC01, and if the own vehicle 101 is stopped, the process proceeds to step SC06.

In step SC06, the normal traveling loop is ended and the process proceeds to step SD01.

Figure 6:
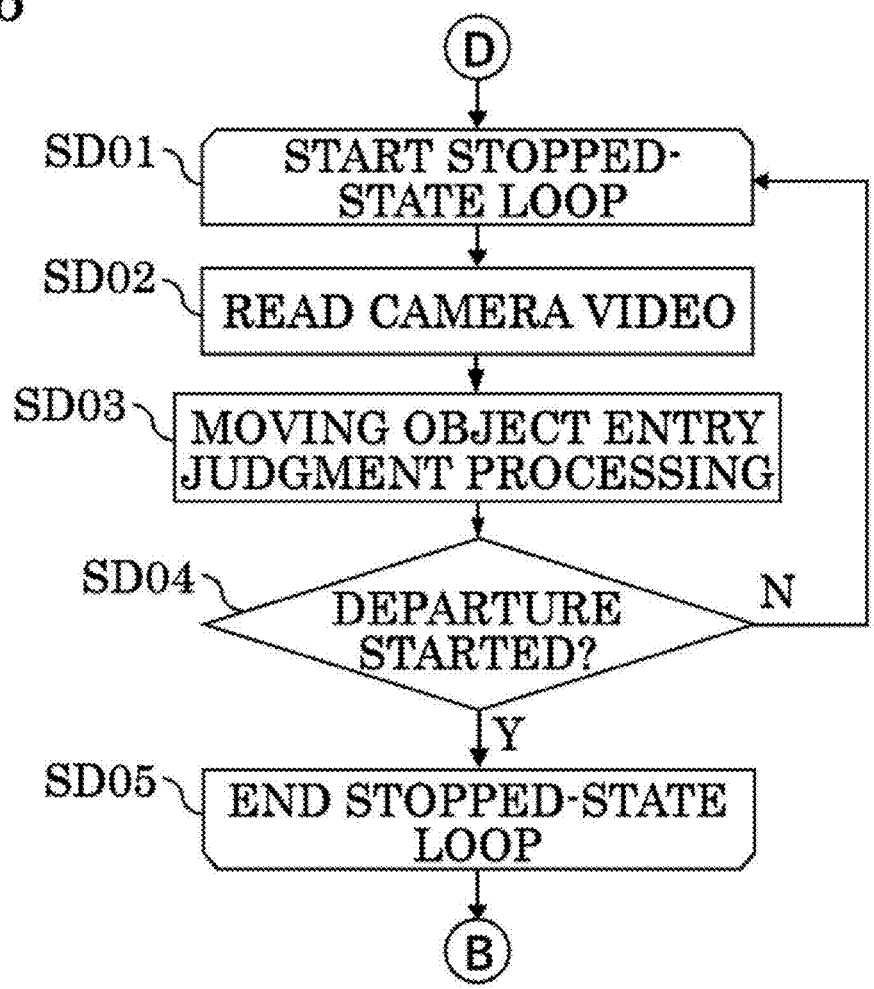
FIG. 6 is a flowchart showing a stopped-state loop in operation of the collision damage reduction device according to the first embodiment.

From step SD01 in the flowchart in FIG. 6, a stopped-state loop is started. In the stopped-state loop, a case such as waiting at a traffic light is assumed, for example. In the stopped-state loop, unlike the stopped-state loop after power on started from step SA01, the situation around the vehicle until the present including a period of normal traveling and then stopping, has been continuously observed by on-vehicle sensors such as the front camera sensor 105a, and therefore whether or not a moving object has entered can be detected.

Next, in step SD02, video from the front camera sensor 105a is read. Here, the read video is not limited to video at present and may be video during normal traveling in the past.

Next, in step SD03, the moving object entry judgment unit 208 analyzes the camera video read in step SD02, to perform moving object entry judgment.

Next, in step SD04, if the own vehicle 101 starts departure, the process proceeds to step SD05, and if the own vehicle 101 does not start departure, the process returns to step SD01.

Next, in step SD05, the stopped-state loop is ended and the process proceeds to step SB01. Here, in judgment in step SB01, if it is judged in step SD03 that the moving object 107 has not entered, the process proceeds to the normal traveling loop without going through the departing-state loop. Thus, it is possible to avoid such an annoying operation that the own vehicle 101 slowly departs with the acceleration and the velocity at the first upper limits even though it is found that there is no obstacle 108 around the own vehicle 101, every time the own vehicle 101 departs at a traffic light or the like.

<Effects of First Embodiment>

As described above, the collision damage reduction device and the collision damage reduction method according to the first embodiment provide an effect of obtaining a collision damage reduction device and a collision damage reduction method that make it possible to, even if there is an obstacle that has not been detected during a vehicle stopped state, significantly reduce damage due to collision with the obstacle at the time of departure operation, using various existing sensors mounted to the vehicle, without needing an additional sensor.

Modification of the First Embodiment

In the first embodiment, a first upper limit velocity value v1 and a first upper limit acceleration value a1 at the first upper limits are determined on the basis of the degree of damage permitted for the own vehicle 101 in a case where the obstacle 108 is assumed around the own vehicle 101 and the own vehicle 101 is assumed to collide with the obstacle 108. Meanwhile, a second upper limit velocity value v2 and a second upper limit acceleration value a2 at the second upper limits are an acceleration and a velocity which are not greater than the first upper limits and are set on the basis of a detection result by the obstacle contact detection unit 204, and in the first embodiment, they are set at 0. Further, a third upper limit velocity value v3 and a third upper limit acceleration value a3 at the third upper limits are an acceleration and a velocity which are not greater than the first upper limits and are set in a case where the vehicle advancement direction obstacle sensor detects any obstacle 108 in the own-vehicle advancement direction, and in the first embodiment, they are set at 0.

In the modification of the first embodiment, the second upper limit velocity value v2 and the second upper limit acceleration value a2 at the second upper limits are set at values that are not greater than the first upper limits and are not 0. As an example, these values are set as shown by the following Expression (1), Expression (2), and Expression (3).

$$v2 = v1 \times k2 \qquad (1)$$

$$a2 = a1 \times k2 \qquad (2)$$

$$0.05 < k2 < 0.1 \qquad (3)$$

That is, using the first upper limit velocity value v1 and the first upper limit acceleration value a1 at the first upper limits as a reference, the second upper limit velocity value v2 and the second upper limit acceleration value a2 at the second upper limits are set.

As described above, by setting the upper limits greater than 0, it is possible to prevent the own vehicle 101 from completely stopping in response to the obstacle 108 such as gravel having a size that allows the own vehicle 101 to run over the obstacle 108 or an obstacle (contact object) such as grass or a stick that does not obstruct traveling, for example. Thus, an uncomfortable feeling of an occupant due to sharp braking can be reduced, and if the own vehicle 101 can pass over the obstacle 108 as described above with the acceleration and the velocity not greater than the second upper limit, the own vehicle 101 can continue departure at the first upper limits.

In the modification of the first embodiment, the third upper limit velocity value v3 and the third upper limit acceleration value a3 at the third upper limits are set at values that are not greater than the first upper limits and are not 0. As an example, these values are set as shown by the following Expression (4), Expression (5), and Expression (6).

$$v3 = v1 \times k3 \qquad (4)$$

$$a3 = a1 \times k3 \qquad (5)$$

$$0.05 < k3 < 0.5 \qquad (6)$$

That is, using the first upper limit velocity value v1 and the first upper limit acceleration value a1 at the first upper limits as a reference, the third upper limit velocity value v3 and the third upper limit acceleration value a3 at the third upper limits are set.

By setting the upper limits greater than 0, it is possible to prevent the own vehicle 101 from completely stopping in response to a small flying object such as a fallen leaf or the obstacle 108 such as an animal that can be avoided on its own. Thus, an uncomfortable feeling of an occupant due to sharp braking can be reduced, and if the obstacle 108 as described above has moved out of the advancement direction on its own, the own vehicle 101 can continue departure at the first upper limits.

While the second upper limit velocity value v2 and the second upper limit acceleration value a2 at the second upper limits are set as shown by Expressions (1) to (3), the third upper limit velocity value v3 and the third upper limit acceleration value a3 may be set at 0. While the third upper limit velocity value v3 and the third upper limit acceleration value a3 at the third upper limits are set as shown by Expressions (4) to (6), the second upper limit velocity value v2 and the second upper limit acceleration value a2 at the second upper limits may be set at 0.

As described above, with the collision damage reduction device and the collision damage reduction method according to the modification of the first embodiment, the second upper limits and the third upper limits can be easily set, thus providing an effect of obtaining a collision damage reduction device and a collision damage reduction method that enable comfortable departure operation while reducing damage due to collision with a moving object and an obstacle at the time of departure operation.

Figure 7:
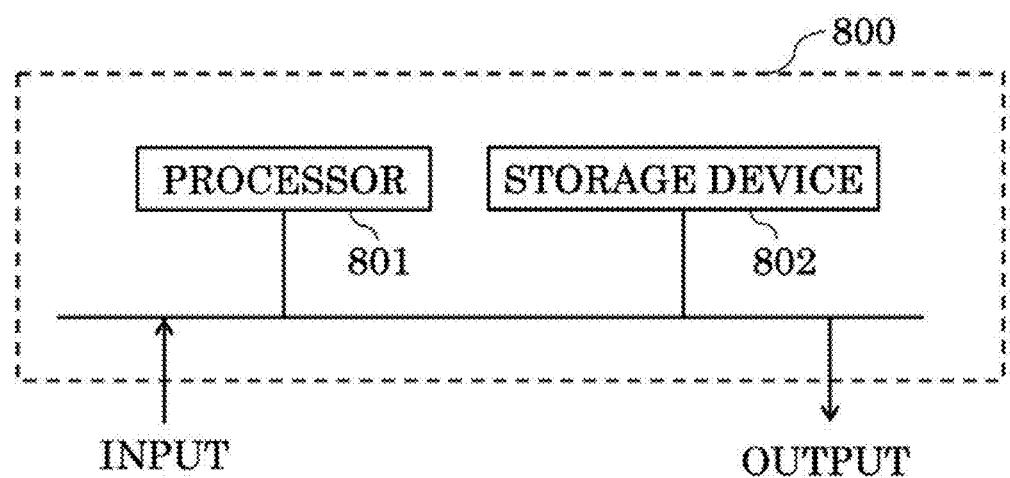
FIG. 7 shows an example of hardware of the collision damage reduction device according to the first embodiment.

In the configuration of the collision damage reduction device 500 according to the first embodiment described above, the collision damage reduction device 500 has been described as function blocks. Meanwhile, an example of the configuration of hardware storing the collision damage reduction device 500 is shown in FIG. 7. Hardware 800 is composed of a processor 801 and a storage device 802. Although not shown, the storage device 802 is provided with a volatile storage device such as a random access memory and a nonvolatile auxiliary storage device such as a flash memory.

Instead of the flash memory, an auxiliary storage device of a hard disk may be provided. The processor 801 executes a program inputted from the storage device 802. In this case, the program is inputted from the auxiliary storage device to the processor 801 via the volatile storage device. The processor 801 may output data such as a calculation result to the volatile storage device of the storage device 802, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

101 own vehicle
102 wheel chock
103 safety cone
104 vehicle advancement direction obstacle sensor (millimeter-wave radar sensor)
104a millimeter-wave radar sensor
105 vehicle advancement direction obstacle sensor (front camera sensor)
105a front camera sensor
106, 106a notification unit
107 moving object
108 obstacle
201 departure judgment unit
202 departing-state acceleration velocity determination unit
203 control unit
204 obstacle contact detection unit
205 tire torque sensor
206 gradient information storage unit
207 pressure-sensitive switch
208 moving object entry judgment unit
209 acceleration velocity sensor
500 collision damage reduction device
800 hardware
801 processor
802 storage device

What is claimed is:

1. A collision damage reduction device comprising at least one processor configured to implement:
   a departure judgment circuitry which detects that a vehicle is in a departing state;
   a departing-state acceleration velocity determinator which determines upper limits for an acceleration and a velocity of the vehicle, when the vehicle is in the departing state; and
   a controller which controls the acceleration and the velocity of the vehicle on the basis of the upper limits determined by the departing-state acceleration velocity determinator; and
   an obstacle contact detector which detects contact with any said obstacle, wherein
   even in a situation in which an obstacle is not detected, the departing-state acceleration velocity determinator determines, as first upper limits, such upper limits for the acceleration and the velocity that do not cause serious damage even if the vehicle contacts with assumed said obstacle, and
   when the obstacle contact detector detects contact with the obstacle, the departing-state acceleration velocity determinator determines the upper limits for the acceleration and the velocity that do not increase damage, as second upper limits that are not greater than the first upper limits.

2. The collision damage reduction device according to claim 1, wherein
   the obstacle contact detector detects contact with the obstacle under a bottom of the vehicle by an abnormal torque of a vehicle tire.

3. The collision damage reduction device according to claim 2, further comprising a gradient information storage which stores gradient information at last-time stop of the vehicle, wherein
   the obstacle contact detector detects contact with the obstacle when a difference arises between the gradient information stored in the gradient information storage and actual gradient information at start of departure and in the departing state.

4. The collision damage reduction device according to claim 1, wherein
the obstacle contact detector detects contact with the obstacle under a bottom of the vehicle by a torque difference between vehicle tires.

5. The collision damage reduction device according to claim 1, wherein
the obstacle contact detector detects contact with the obstacle in a vehicle advancement direction by a pressure-sensitive switch provided to a bumper of the vehicle.

6. The collision damage reduction device according to claim 1, further comprising a vehicle advancement direction obstacle sensor serving to improve detection performance for the obstacle in a vehicle advancement direction during traveling of the vehicle.

7. The collision damage reduction device according to claim 6, wherein
when the vehicle advancement direction obstacle sensor has detected the obstacle in the departing state of the vehicle, the departing-state acceleration velocity determinator determines the upper limits for the acceleration and the velocity as third upper limits not greater than the first upper limits.

8. The collision damage reduction device according to claim 7, wherein
the vehicle advancement direction obstacle sensor is a ranging sensor and serves to improve detection performance by change in a distance or a relative velocity with respect to the obstacle.

9. The collision damage reduction device according to claim 7, wherein
the vehicle advancement direction obstacle sensor is an imaging sensor and serves to improve detection performance by a difference in change in the obstacle and a background of the obstacle or by change in optical characteristics.

10. The collision damage reduction device according to claim 1, further comprising a moving object entry judgment circuitry which, in a case where a moving object around the own vehicle has entered into a certain range around the own vehicle during a stopped state and has not exited the certain range until departure, considers that the moving object has entered, wherein
when the moving object entry judgment circuitry has considered that the moving object has not entered, the departing-state acceleration velocity determinator clears the first upper limits for the acceleration and the velocity.

11. A collision damage reduction method comprising:
detecting that a vehicle is in a departing state;
determining upper limits for an acceleration and a velocity of the vehicle, when the vehicle is in the departing state; and
controlling the acceleration and the velocity of the vehicle on the basis of the upper limits determined in the departing-state acceleration velocity determining,
detecting contact with any said obstacle, wherein
in the departing-state acceleration velocity determining, even in a situation in which an obstacle is not detected, such upper limits for the acceleration and the velocity that do not cause serious damage even if the vehicle contacts with assumed said obstacle are determined as first upper limits, and
in the departing-state acceleration velocity determining, when contact with the obstacle is detected, the upper limits for the acceleration and the velocity that do not increase damage, are determined as second upper limits that are not greater than the first upper limits.

* * * * *